US008958601B2

United States Patent
Lin

(10) Patent No.: US 8,958,601 B2
(45) Date of Patent: Feb. 17, 2015

(54) OPTICAL NAVIGATION METHOD AND DEVICE USING SAME

(71) Applicant: Chun-Huang Lin, HsinChu (TW)

(72) Inventor: Chun-Huang Lin, HsinChu (TW)

(73) Assignee: Chip Goal Electronics Corporation, HsinChu (TW)

( * ) Notice: Subject to any disclaimer, the term of this patent is extended or adjusted under 35 U.S.C. 154(b) by 224 days.

(21) Appl. No.: 13/847,396

(22) Filed: Mar. 19, 2013

(65) Prior Publication Data

US 2014/0185866 A1 Jul. 3, 2014

(30) Foreign Application Priority Data

Jan. 2, 2013 (TW) .............................. 102100035 A

(51) Int. Cl.
*G06K 9/00* (2006.01)
*G06T 7/20* (2006.01)

(52) U.S. Cl.
CPC ..... *G06T 7/2013* (2013.01); *G06T 2207/10016* (2013.01); *G06T 2207/20021* (2013.01)
USPC ........................................................ 382/103

(58) Field of Classification Search
USPC ........................................................ 382/103
See application file for complete search history.

(56) References Cited

U.S. PATENT DOCUMENTS

| | | | | |
|---|---|---|---|---|
| 5,400,087 A * | 3/1995 | Uramoto et al. | ............... | 348/699 |
| 5,751,283 A * | 5/1998 | Smith | ............ | 715/798 |
| 5,838,828 A * | 11/1998 | Mizuki et al. | ................. | 382/236 |
| 5,859,673 A * | 1/1999 | Kobayashi et al. | ........... | 348/699 |
| 6,014,181 A * | 1/2000 | Sun | ................. | 348/699 |
| 6,122,318 A * | 9/2000 | Yamaguchi et al. | .......... | 375/240 |
| 6,249,550 B1 * | 6/2001 | Mizuno et al. | ........... | 375/240.24 |
| 6,625,333 B1 * | 9/2003 | Wang et al. | .................... | 382/300 |
| 8,358,876 B1 * | 1/2013 | Gilra et al. | .................... | 382/298 |
| 2003/0086496 A1 * | 5/2003 | Zhang et al. | ............. | 375/240.16 |
| 2005/0265603 A1 * | 12/2005 | Porter et al. | ................... | 382/190 |
| 2008/0101710 A1 * | 5/2008 | Hatano | ......... | 382/238 |
| 2008/0212679 A1 * | 9/2008 | Lin et al. | .................. | 375/240.16 |
| 2009/0222388 A1 * | 9/2009 | Hua et al. | ......................... | 706/12 |
| 2009/0303342 A1 * | 12/2009 | Corcoran et al. | .......... | 348/222.1 |
| 2014/0185866 A1 * | 7/2014 | Lin | ............................... | 382/103 |

* cited by examiner

*Primary Examiner* — Alex Liew
(74) *Attorney, Agent, or Firm* — Tung & Associates

(57) ABSTRACT

The invention provides an optical navigation method, which includes: sequentially obtaining plural images including a first image, a second image, and a third image; choosing a main reference block in the first image; comparing the main reference block and the second image by block matching comparison to determine a first motion vector; resizing the main reference block according to the first motion vector to generate an ancillary reference block having a size smaller than the main reference block; and comparing the ancillary reference block and the third image by block matching comparison to determine a second motion vector.

36 Claims, 8 Drawing Sheets

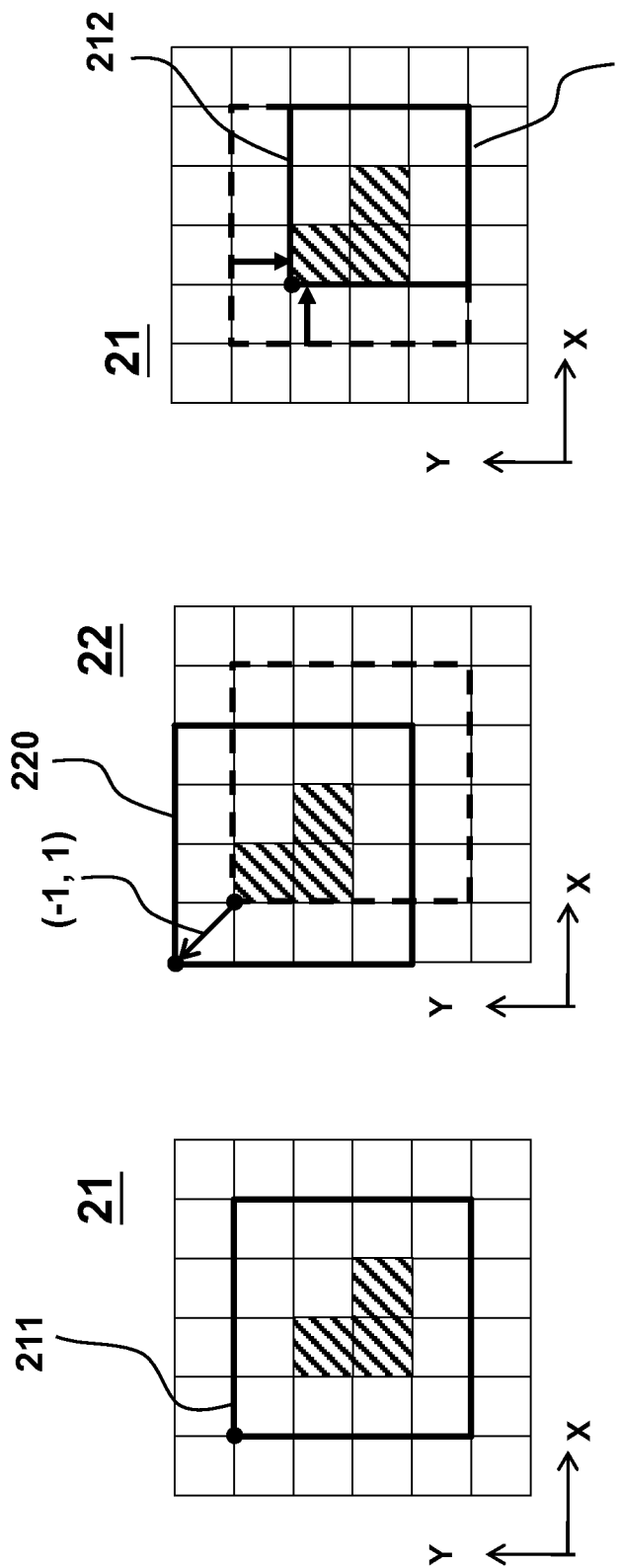

OPTICAL NAVIGATION METHOD AND DEVICE USING SAME

CROSS REFERENCE

The present invention claims priority to TW 102100035, filed on Jan. 2, 2013.

BACKGROUND OF THE INVENTION

1. Field of Invention

The present invention relates to an optical navigation method, especially an optical navigation method wherein the size of a reference block used for block matching is adjusted according to a motion vector, to thereby increase overall calculation efficiency. The present invention also provides a device using the optical navigation method.

2. Description of Related Art

Optical navigation method is a method of calculating displacements by comparing received images. One of the methods for comparison is block matching. Because it requires a very large amount of calculation to compare one complete image with another complete image, a reference block smaller than the complete image is chosen, and this reference block is compared with all possible locations in a next image (referred to as "fully search") to calculate a correlation error for every possible location, and a most matching location which corresponds to a matching block is determined. The difference between the coordinate of the matching block at the most matching location and the coordinate of the reference block determines the motion vector of a feature in the images. In the above method, the size of the reference block influences the correlation error calculation; for a reference block having a larger size, the precision for calculating correlation errors is better but the required calculation amount is larger; in contrast, for a reference block having a smaller size, the required calculation amount is less but the precision for calculating correlation errors is lower.

FIG. 1 shows a block matching method according to prior art. Images 11 and 12 are two sequentially captured images, and a reference block 111 is chosen in the image 11. In this example, it is assumed that the image 11 has a size of 6×6, and the chosen reference block has a size of 4×4. The 4×4 reference block is compared with all possible matching locations in the image 12, that is, the upper left corner of the reference block 111 (shown as a black dot in the image 11) may be located at nine possible locations (shown as the hollow dots) in the image 12. The nine possible matching locations are examined by correlation error calculations, and a most matching block 121 corresponding to the reference block 111 is determined because it has the smallest correlation error. The correlation error can be calculated by any known method, such as by block average, feature area, difference between adjacent pixels, etc. After determining the matching block 121, the coordinate of the matching block 121 is compared with the coordinate of the reference block 111 to determine a motion vector; in the X, Y coordinate system shown in the figure, the (X displacement, Y displacement) is illustrated as (−1, 1). The original reference block 111 has moved to a new location, i.e., the reference block 123, so a new reference block 124 is chosen in the image 12, and the aforementioned steps are repeated for calculating the next motion vector.

In the aforementioned prior art, the size of the reference block is fixed, and therefore the calculation efficiency and the precision can not be both optimized. Furthermore, the reference block needs to be frequently updated, which greatly increases the calculation loading. In view of these drawbacks, the present invention provides an optical navigation method which compares two images to generate a motion vector and adjusts the size of the reference block according to the motion vector, and preferably adjusts an area for block matching comparison according to the motion vector, to increase the efficiency of comparison and overall calculation, while maintaining the precision of comparison and calculation.

SUMMARY OF THE INVENTION

In one aspect, the present invention provides an optical navigation method, which includes: sequentially obtaining plural images including a first, a second, and a third image; choosing a main reference block in the first image according to a predetermined sampling region and sampling size; comparing the main reference block and the second image by block matching comparison to determine a first motion vector; resizing the main reference block according to the first motion vector to generate an ancillary reference block having a size smaller than the main reference block; and comparing the ancillary reference block and the third image by block matching comparison to determine a second motion vector.

In a preferable embodiment of the present invention, the ancillary reference block is kept updated according to a most recent motion vector. Preferably, the updated ancillary reference block has a size not smaller than a lower limit.

In a preferable embodiment of the present invention, the step of generating or updating the ancillary reference block includes: reducing a horizontal size of the main reference block from the side where a horizontal component of the first, the second or a most recent motion vector is moving toward by an amount corresponding to the horizontal component, and/or reducing a vertical size of the main reference block from the side where a vertical component of the first, the second or a most recent motion vector is moving toward by an amount corresponding to the vertical component.

In a preferable embodiment of the present invention, the optical navigation method further includes: resizing an area for block matching comparison with the ancillary reference block in the captured image according to the first, the second or a most recent motion vector.

In a preferable embodiment of the present invention, the step of resizing the area for block matching comparison with the ancillary reference block in the captured image includes: reducing the area for block matching comparison from a side opposite to where a horizontal component of an average of plural previous motion vectors is moving toward by an amount corresponding to the horizontal component, and/or reducing the area for block matching comparison from a side opposite to where a vertical component of an average of plural previous motion vectors is moving toward by an amount corresponding to the vertical component.

In another preferable embodiment of the present invention, the optical navigation method further includes: generating new motion vectors according to new images; updating the ancillary reference block according to a most recent motion vector; and performing one of the following steps when the updated ancillary reference block does not have an enough feature value:

(1) choosing a new main reference block in a most recent image according to the predetermined sampling region and sampling size;

(2) choosing a new main reference block in a most recent image according to a horizontal component and/or a vertical component of a most recent motion vector; or (3) choosing a new ancillary reference block in a most recent image by reducing a horizontal size of the predetermined sampling region from a side where a horizontal component of a most recent motion vector is moving toward by an amount corresponding to the horizontal component, and/or reducing a vertical size of the predetermined sampling region from a side where a vertical component of the second motion vector is moving toward by an amount corresponding to the vertical component.

In another preferable embodiment of the present invention, the optical navigation method further includes: generating new motion vectors according to new images; updating the ancillary reference block according to the most recent motion vector; and choosing a new main reference block or a new ancillary reference block in a most recent image when one or more of the following conditions is satisfied:

(1) the updated ancillary reference block according to the most recent motion vector has a size smaller than a predetermined lower limit;
(2) a feature value of the updated ancillary reference block according to the most recent motion vector is lower than a predetermined threshold feature value, wherein the feature value is calculated according to a predefined calculation method;
(3) there are two or more possible matching locations where a most recent ancillary reference block corresponds to in the most recent image; and
(4) a time period from choosing a last main reference block to obtaining the most recent image exceeds a predetermined threshold time period.

In another preferable embodiment of the present invention, a motion trend can be confirmed according to plural most recent motion vectors, and a new main reference block or a new ancillary reference block is chosen in the most recent image according to the motion trend if the motion trend is confirmed. The motion trend can be confirmed for example by: confirming whether a motion along a direction lasts for more than a threshold period of time or is counted for more than a threshold number of times; or confirming whether an average motion along a direction is larger than a threshold.

According to another aspect, the present invention also provides a device for executing the optical navigation method, which includes: an image capturing unit, for sequentially capturing plural images and generating corresponding electronic data, wherein the plural images including a first image, a second image, and a third image; a motion vector calculating unit, for receiving the electronic data from the image capture unit and calculating motion vectors according to the aforementioned optical navigation method; and a memory unit, for storing the main reference block and/or the ancillary reference block.

The objectives, technical details, features, and effects of the present invention will be better understood with regard to the detailed description of the embodiments below, with reference to the drawings.

BRIEF DESCRIPTION OF THE DRAWINGS

FIGS. 2A~2M show a preferable embodiment of the optical navigation method according to the present invention.

DESCRIPTION OF THE PREFERRED EMBODIMENTS

Figure 1:
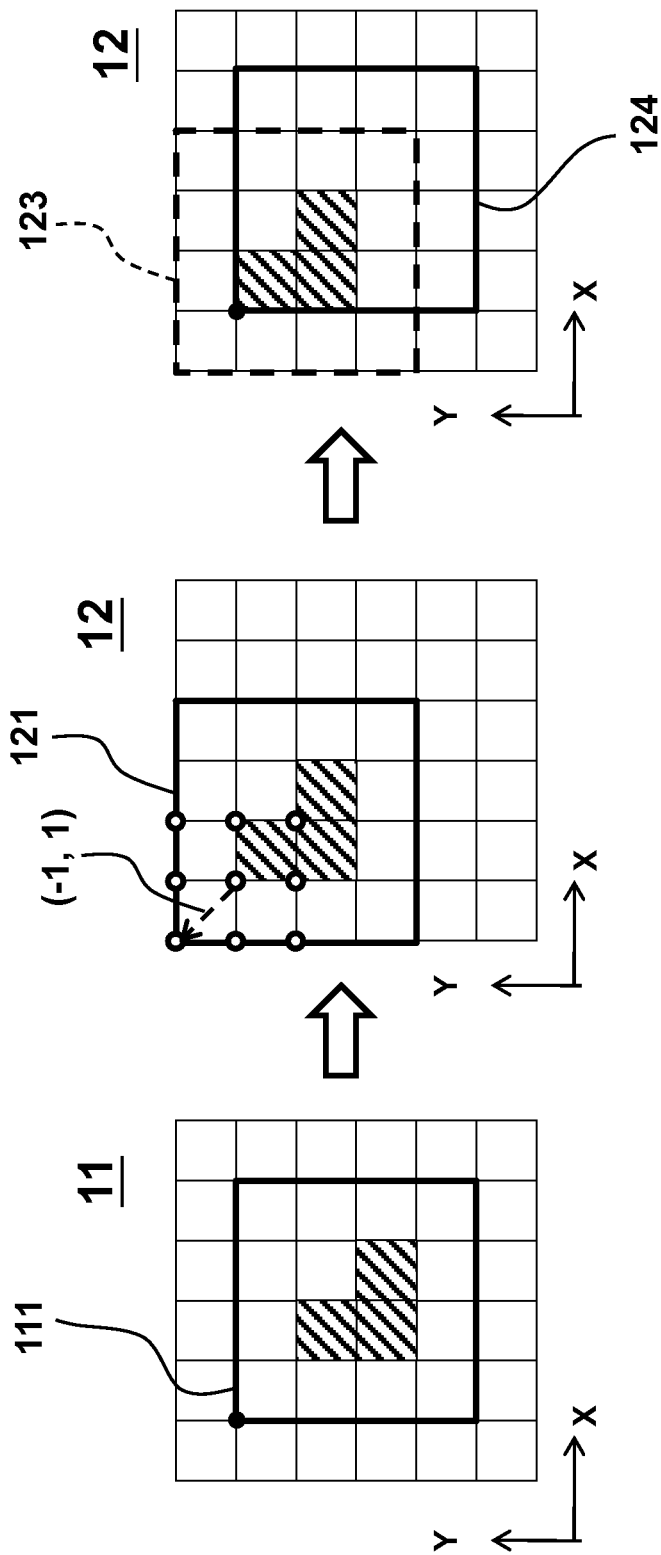
FIG. 1 shows a prior art the optical navigation method.

The drawings as referred to throughout the description of the present invention are for illustrative purpose only, but not drawn according to actual scale. The orientation wordings in the description such as: up, down, left, or right are for reference with respect to the drawings, but not for limiting the actual product made according to the present invention.

Referring to FIGS. 2A, 2B, and 2C, an embodiment of the optical navigation method according to the present invention is shown. The images 21 and 22 shown in FIGS. 2A and 2B are two sequentially captured images; a main reference block 211 is chosen in the image 22 according to a predetermined sampling region and sampling size. By correlation error calculation, a matching block 220 corresponding to the main reference block 211 is found in the image 22. The correlation error calculation can use any known method. After deciding the matching block 220, a motion vector (X displacement, Y displacement)=(−1, 1) is obtained by comparing the coordinates of the main reference block 211 and the matching block 220.

One feature of the present invention is: adjusting the size of the reference block according to the motion vector. FIG. 2C shows a successive step following the step of FIG. 2B. Because the motion vector is (−1, 1), the original main reference block 211 in the image 21 is resized in opposite direction(s) to the calculated motion vector, to generate an ancillary reference block 212. In the present embodiment, the method includes: based on a horizontal component of the motion vector, reducing the horizontal size of the main reference block 211 from the side where the horizontal component of the motion vector is moving toward, in an opposite direction to the horizontal component of the motion vector; and based on a vertical component of the motion vector, reducing the vertical size of the main reference block 211 from the side where the vertical component of the motion vector is moving toward, in an opposite direction to the vertical component of the motion vector. Taking the motion vector (−1, 1) for example, because the horizontal component (X displacement) is −1 (moving left by one unit), as shown in FIG. 2C, the main reference block 211 is reduced from its left side (the side where the horizontal component of the motion vector is moving toward) by one unit rightward. And because the vertical component (Y displacement) is +1 (moving up by one unit), as shown in FIG. 2C, the main reference block 211 is reduced from its upper side (the side where the vertical component of the motion vector is moving toward) by one unit downward. Thus, the ancillary reference block 212 is generated by resizing the main reference block 211. Note that the ancillary reference block 212 is generated from the main reference block 211, but is not reselected from the image 22; therefore, steps such as reading the image, reselecting a reference block from the image, and storing the reference block in a memory are not required. Hence, the calculation loading is therefore far less than the prior art.

Figure 2F:
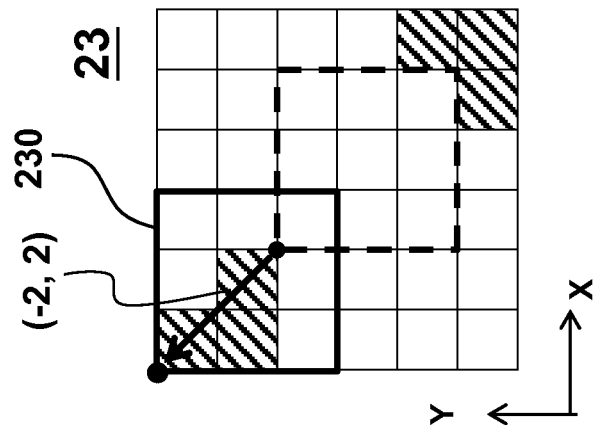
Figure 2E:
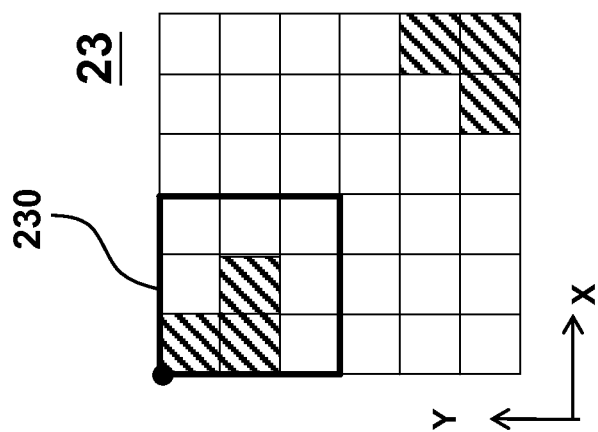
Figure 2D:
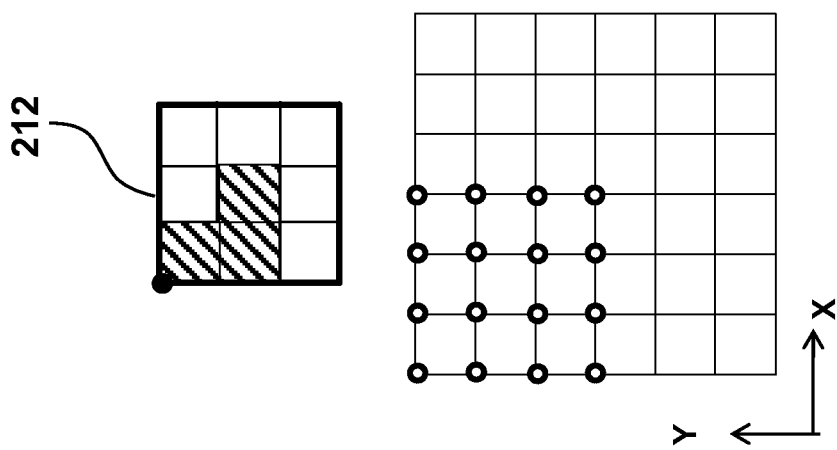

Referring to FIG. 2D, the size of the ancillary reference block 212 becomes 3×3 and therefore there are sixteen possible matching locations for fully search (the upper left corner of the ancillary reference block 212, as shown by the black dot, has sixteen possible matching locations, as marked by the hollow dots). In one embodiment of the present invention, all these sixteen possible locations are checked (fully search). In another embodiment of the present invention, the area for block matching comparison can be reduced; the details of this embodiment will be described later.

Referring to FIG. 2E, an image 23 is successively captured after the image 22. By correlation error calculation, a matching block 230 in the image 23 is decided, which best matches the ancillary reference block 212. After deciding the matching block 203, as shown in FIG. 2F, a motion vector (X displacement, Y displacement)=(−2, 2) is obtained by comparing the coordinates of the ancillary reference block 212 and the matching block 203.

Figure 2I:
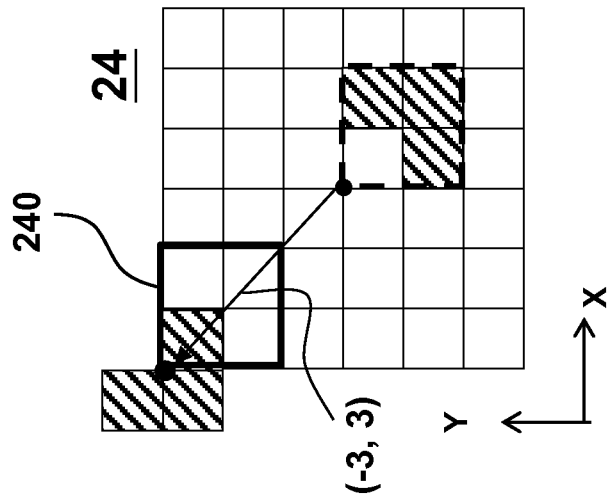
Figure 2H:
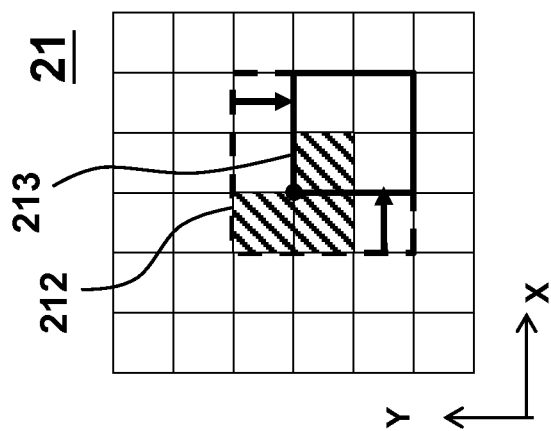
Figure 2G:
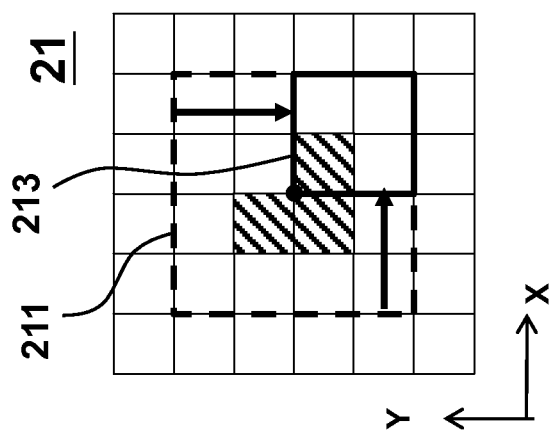

Referring to FIG. 2G, an ancillary reference block 213 is obtained by resizing the main reference block 211 according to the motion vector (−2, 2). The ancillary reference block 213 can be regarded as reducing the main reference block 211 by two units from the left side and two units from the upper side, or reducing the ancillary reference block 212 by one unit from the left side and one unit from the upper side (referring to FIG. 2H). To obtain the ancillary reference block 213 by resizing the main reference block 211 and to obtain the ancillary reference block 213 by resizing the ancillary reference block 212 are equivalent in concept and result; however, they require different ways of calculations, and the implementations of the calculations can be determined as desired and preferred by a programmer.

Referring to FIG. 2I, an image 24 is successively captured after the image 23. By correlation error calculation, a matching block 240 in the image 24 is decided. After deciding the matching block 240, a motion vector (X displacement, Y displacement)=(−3, 3) is obtained by comparing the coordinates of the ancillary reference block 213 and the matching block 240. In one embodiment of the present invention, another ancillary reference block can be obtained according to the motion vector (−3, 3), in a way similar to what is described in the above.

In another embodiment of the present invention, a lower limit is set for the size of the ancillary reference block, such as 2×2, and the size of the ancillary reference block is not reduced anymore when the size reaches this lower limit (however, the size of the ancillary reference block can be extended according to the motion vector, which will be explained in detail later). In this embodiment, even if the motion vector is (−3, 3) or some higher numbers, the size of the ancillary reference block still keeps 2×2.

When the size of the reference block is reduced to a certain extent, the reference block might not include an enough feature value to correctly decide a matching block, and it can result in a misjudgment. The so-called "feature value" may be defined by any of various definitions such as the number of pixels with brightness higher than a reference brightness, the number of pixels having a brightness difference with an adjacent pixel that is higher than a reference value, etc. In one embodiment, if the ancillary reference block does not have an enough feature value, a new main reference block is chosen (i.e., the main reference block is updated). The timing for updating the main reference block for example can be determined according to: whether the size of the ancillary reference block reaches a predetermined limit, whether the feature value in the main or ancillary reference block is not enough, or when it is unable to find a matching block. Or, when the same main or ancillary reference block has been used for more than a predetermined threshold time period, the main reference block can be updated. The above criteria for updating the main reference block can be used alone, or two or more of them can be adopted in combination.

Figure 2L:
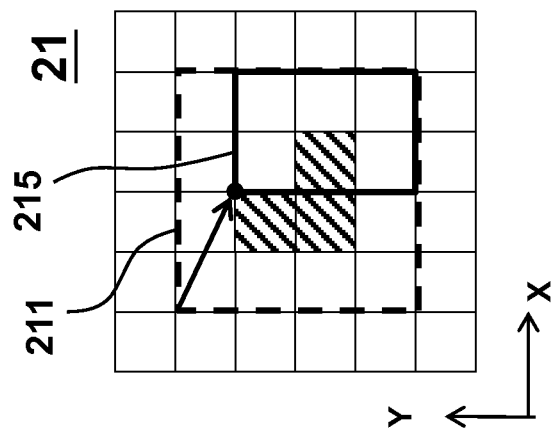

For example, in the embodiment wherein the main reference block is updated according to the size of the ancillary reference block, a threshold size can be set, for example but not limited to the same as the aforementioned lower limit, which is 2×2 in the given example. When reducing the ancillary reference block according to the motion vector will cause the size of the ancillary reference block to be lower than the threshold size, the main reference block can be updated. Referring to FIG. 2I, the motion vector is (−3, 3). If there is no lower limit, the main reference block 211 should be reduced by three units from the left side and three units from the upper side to generate a new ancillary reference block. However, this resizing will cause the new ancillary reference block to have a size smaller than the threshold size, so a new main reference block 214 is chosen in the image 24 according to the predetermined sampling region and sampling size, as shown in FIG. 2J.

For another example, in the embodiment wherein the main reference block is updated according to the feature value in the main or ancillary reference block, a feature threshold can be set according to the definition of the feature value, such as a threshold of total brightness, average brightness, number of pixels having brightness higher than a brightness reference, or number of pixels having brightness difference with an adjacent pixel that is higher than a reference value, etc. When the feature value of the main or ancillary block is lower than the feature threshold, a new main reference block is chosen. Referring to FIG. 2H, if the feature value of the ancillary reference block 213 is not enough, a new main reference block 214 in the image 24 is chosen according to the predetermined sampling region and sampling size, as shown in FIG. 2H.

For yet another example, in the embodiment wherein the main reference block is updated when it is unable to find a matching block for sure, then a criterion for "surely finding a matching block" should be set, which for example can be but not limited to a distinction threshold. For example, after correlation error calculation, it is found that there are two blocks which may correspond to the main or ancillary reference block, one having a lowest correlation error and the other having a second lowest correlation error, but the difference between the two correlation errors does not exceed the distinction threshold, that is, both blocks could possibly be the matching block and none of them can be sure, then the main reference block is updated. Referring to FIG. 2J, a new main reference block 214 is chosen in the image 24 according to the predetermined sampling region and sampling size. What is described in the above is only for example only; in this embodiment, regardless what calculation means is adopted, when it is unable to find a matching block for sure, a new main reference block can be chosen.

For yet another example, if the time period from choosing the main reference block 211 to obtaining the image 24 exceeds a predetermined threshold time period, a new main reference block 214 can be chosen according to the predetermined sampling region and sampling size.

Furthermore, it is not necessary to choose a new main reference block (such as the main reference block 214) according to the predetermined sampling region and sampling size; instead, a new reference block at a different location or having a different size can be chosen according to a motion trend at that moment, or the main reference block 214 is still chosen, but in processing the block matching comparison, an ancillary reference block obtained by resizing the main reference block 214 is used for comparison. Examples are described below.

In a first embodiment, a new main reference block can be chosen by moving toward an opposite direction of a most recent motion vector or an average motion vector over a previous period of time. For example, if the motion vector from FIG. 2E to FIG. 2I is (−1, 1), then a main reference block 214' with the same size but at a different location can be chosen by moving in an opposite direction by (1, −1), as shown in FIG. 2J. For another example, the average motion vector from FIG. 2A to FIG. 2I is (−1, 1), so the main reference block 214' is also chosen if it is chosen according to the average motion vector, by moving in an opposite direction by (1, −1). If the average motion vector is not in integer, any integer rounding method such as rounding off, rounding up, rounding down, etc. can be used to obtain an integer. In the other part of the present invention where any number requires to be an integer, it can be processed by this rule.

In a second embodiment, a new ancillary reference block can be directly chosen by resizing the sampling region according to a most recent motion vector or an average motion vector over a previous period of time. For example, if the motion vector from FIG. 2E to FIG. 2I is (−1, 1), the ancillary reference block 214" can be directly chosen as shown in FIG. 2J. The average motion vector from FIG. 2A to FIG. 2I is also (−1, 1), so the ancillary reference block 214" is also chosen if it is chosen according to the average motion vector. In the second embodiment, the step of obtaining the main reference block can be omitted or not omitted; that is, the ancillary reference block 214" can be directly chosen without obtaining the main reference block 214, or the main reference block 214 is still obtained and stored.

The reason for choosing a new reference block at a different location or a different size according to the motion trend is because: if there is a motion trend moving toward a direction, then a reference block chosen along the opposite direction of the motion trend will less likely be obsolete in a short time, and the chosen reference block does not need to be updated very frequently. However, because there could be some noise in obtaining the images, the motion trend might not be judged correctly. Hence, if it is required to more accurately judge the motion trend, a confirmation step with a judgment criterion can be set to make sure whether it is proper to change the location and/or size of the reference block. If the criterion is not satisfied, the main reference block is chosen according to original location and size; if the criterion is satisfied, the location and/or size can be changed.

The judgment criterion for confirming the motion trend for example can be, but not limited to: setting a threshold time period or a threshold number of times; the location and/or size of the reference block is changed only if the motion vector (or a component thereof in a dimension) maintains its direction for a time period or a number of times that is longer/larger than the threshold time period or threshold number of times. For example, let us assume that the threshold is 2 time units or 2 times. From FIG. 2A to FIG. 2I, the motion vector continues to move along the negative X direction for 3 time units (or 3 times if each time unit counts once). Hence, a motion trend toward the negative X direction is confirmed, and the location and/or size of the new reference block can be changed in the X dimension. Whether the location and/or size of the new reference block in the Y dimension should be changed can be determined similarly. What is described in the above is for illustrative purpose only; the number can be changed, and the motion trend can be confirmed by means other than setting threshold time period or threshold number of times, such as by checking whether an average motion vector is larger than a threshold.

Figure 2K:
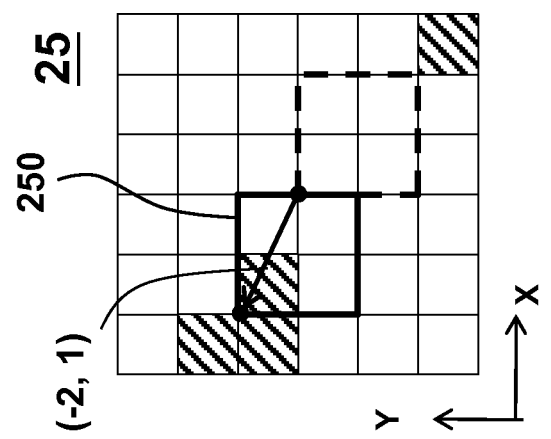
Figure 2J:
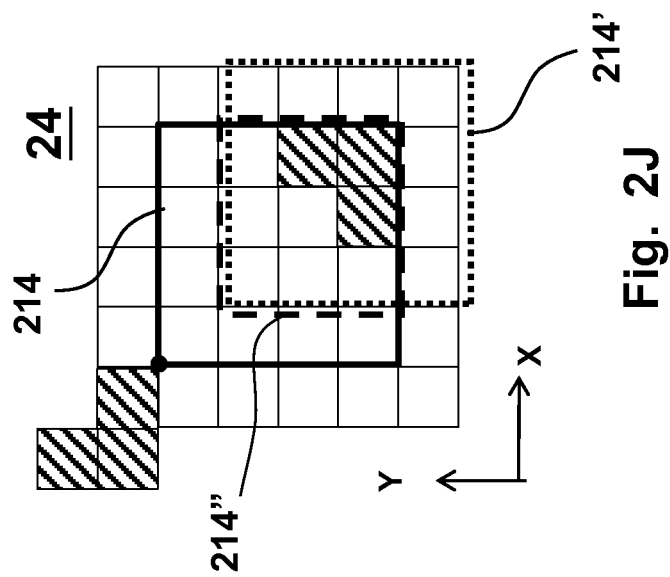

FIG. 2K shows another condition. Let us assume that after the step shown in FIG. 2E, the system obtains the image 25 shown in FIG. 2K instead of the image 24 shown in FIG. 2J. According to the aforementioned rule, a motion vector (−2, 2) is calculated according to the image 23 shown in FIG. 2E, so the ancillary reference block 213 of FIG. 2H is determined. As shown in FIG. 2K, a matching block 250 corresponding to the ancillary reference block 213 is found in the image 25 by correlation error calculation. After deciding the matching block 250, a motion vector (X displacement, Y displacement) =(−2, 1) can be obtained by comparing the coordinates of the ancillary reference block 213 and the matching block 250.

Figure 2M:
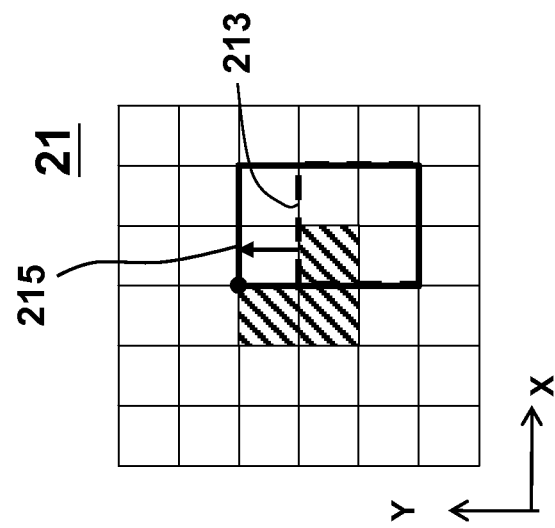

Referring to FIG. 2L, a new ancillary reference block 215 is obtained by resizing the main reference block 211 according to the most recent motion vector. The ancillary reference block 215 can be regarded as reducing 2 units from the left side and 1 unit from the upper side of the main reference block 211, or alternatively, referring to FIG. 2M, the ancillary reference block 215 can be regarded as increasing 1 unit from the side opposite to the direction where the motion vector is moving toward. The motion vector from FIG. 2E to FIG. 2K is (0, −1), so the motion direction is downward; therefore, the upper side (opposite to the downward direction of the motion vector) is increased by one unit. No matter the ancillary reference block 215 is regarded as being obtained from the main reference block 211 or from the ancillary reference block 213, the concept and result are the same, and therefore they are equivalent. However, the detailed calculations thereof are different, so which of them is adopted can be determined by a programmer as desired and preferred.

It is described in the above that the original size of the main reference block is determined according to the predetermined sampling region. In an embodiment of the present invention, the size of the predetermined sampling region can be determined according to the required accuracy and efficiency for calculation. In block matching calculation (correlation error calculation), the calculating efficiency depends on two main factors: block size and matching calculation quantity. For a larger block size, the correlation error calculation needs longer time for calculating each block but there are fewer matching blocks to be compared. For a smaller block size, the correlation error calculation needs shorter time for calculating each block but there are more matching blocks to be compared. Therefore, an optimal block size can be determined according to a balance of these two factors, so that both accuracy and calculating time are acceptable, and the predetermined sampling region can be decided thereby. However, the choice of the sampling region can be determined according to other factors such as the optical characteristics of the device, so the aforementioned rule for determining the sampling region is for illustrative purpose but not to be taken as limiting.

It is described in the above that, when the size of the reference block is reduced, the number of matching calculations for fully search will increase. Therefore, in one embodiment of the present invention, when the size of the reference block is reduced, the search area is correspondingly reduced, so that the number of matching calculations is correspondingly reduced.

Figure 3B:
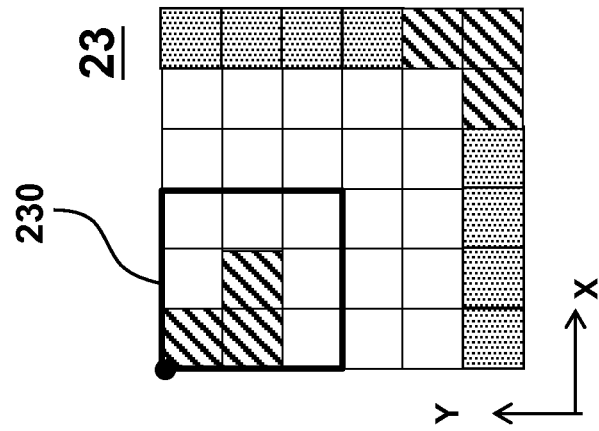
FIGS. 3A~3E show another preferable embodiment of the optical navigation method according to the present invention.
Figure 3A:
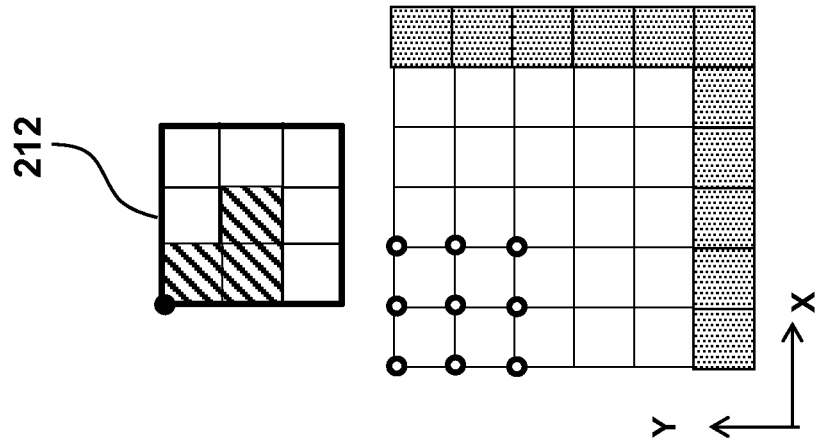

Referring to FIGS. 2A-2C, two images 21 and 22 are sequentially obtained, and a main reference block 211 is chosen in the image 21 according to the predetermined sampling region. A matching block 220 matching with the main reference block 211 is obtained in the image 22 by correlation error calculation, and a motion vector (−1, 1) is therefore obtained. An ancillary reference block 212 is obtained by resizing the main reference block 211 according to the motion vector. Now referring to FIGS. 2D and 3A, in the aforementioned embodiments, a fully search is performed, and there are sixteen possible matching locations as shown in FIG. 2D. In this embodiment, the area for block matching comparison is reduced from the side opposite to a motion direction according to the most recent motion vector. In detail, as shown in FIG. 3A, the motion vector is (−1, 1) whose directions are leftward and upward, so the area for block matching comparison is reduced one unit from the opposite side (right side) of the horizontal component of the motion vector, and reduced one unit from the opposite side (lower side) of the vertical component of the motion vector, as shown by the shadowed area shown in FIG. 3A, and the area inside the shadowed area is not subject to block matching comparison. Thus, the ancillary reference block 212 is only compared with the nine possible matching locations as shown in FIG. 3A, and a matching block 230 is determined in the comparing process as shown in FIG. 3B.

Figure 3E:
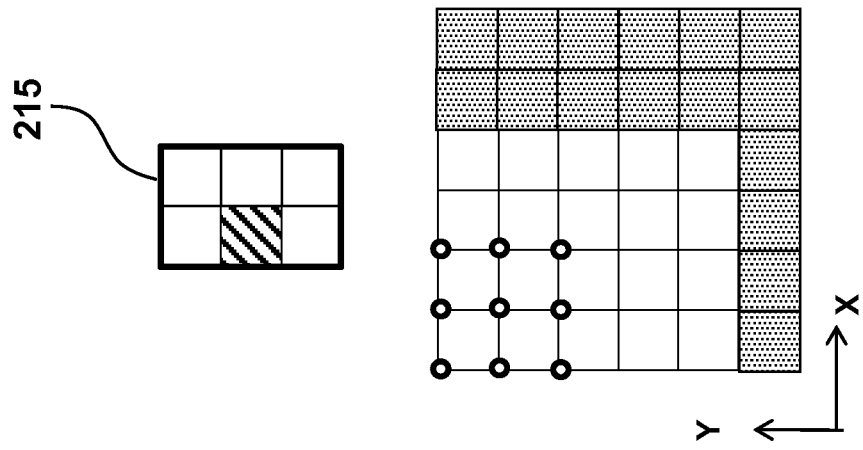

Similarly, referring to FIGS. 2F and 2G, when the motion vector is (−2, 2), the ancillary reference block 213 is used for block matching. As shown in FIG. 3C, the area for block matching comparison is reduced by 2 units respectively from the right side and lower side, and the number of possible matching locations is only nine.

Figure 3D:
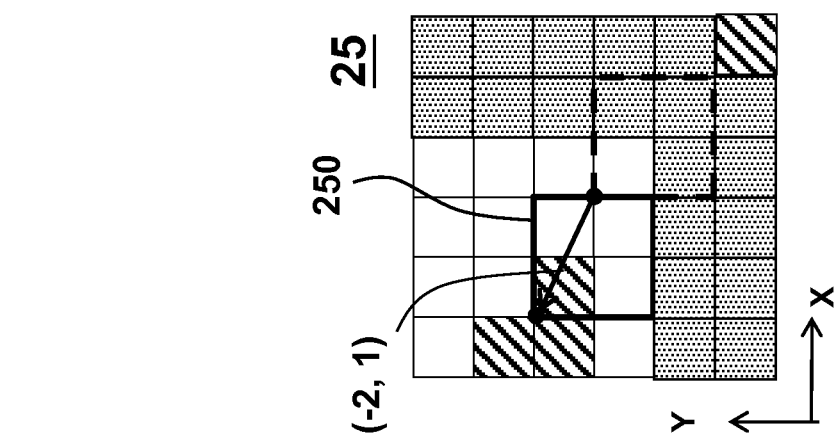
Figure 3C:
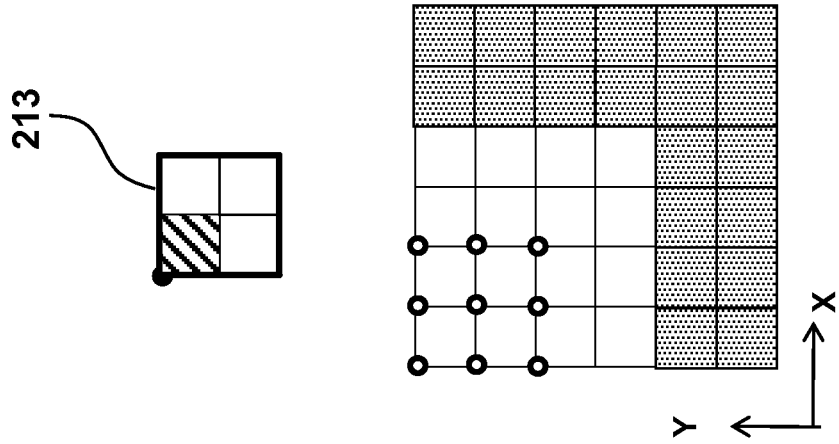

Referring to FIG. 3D, assuming that the next image is the image 25, a matching block 250 can be found from the nine possible matching locations shown in FIG. 3C.

Referring to FIG. 3E, because the motion vector obtained according to FIG. 3D is (−2, 1), the area for block matching comparison is resized 2 units from the right side and 1 unit from the lower side; the number of the possible matching locations is still nine.

The aforementioned method of resizing the area for block matching comparison can reduce the calculation quantity so that the overall calculation efficiency can be improved.

It should be noted that besides adjusting the area for block matching comparison according to the most recent motion vector, the area for block matching comparison can also be adjusted according to an average motion vector obtained according to previous several motion vectors. And, similar to the case when updating the reference block with size and/or location adjustments, there could be some noise during capturing images and it can cause a misjudgment in obtaining the motion vector; therefore, the adjustment of the area for block matching comparison can be done after the motion trend is confirmed. The motion trend can be confirmed for example by any of the aforementioned methods, i.e., by judging whether a motion along a direction lasts for more than a threshold time period or is counted for more than a threshold number of times, or an average motion along a direction is larger than a threshold.

Figure 4:
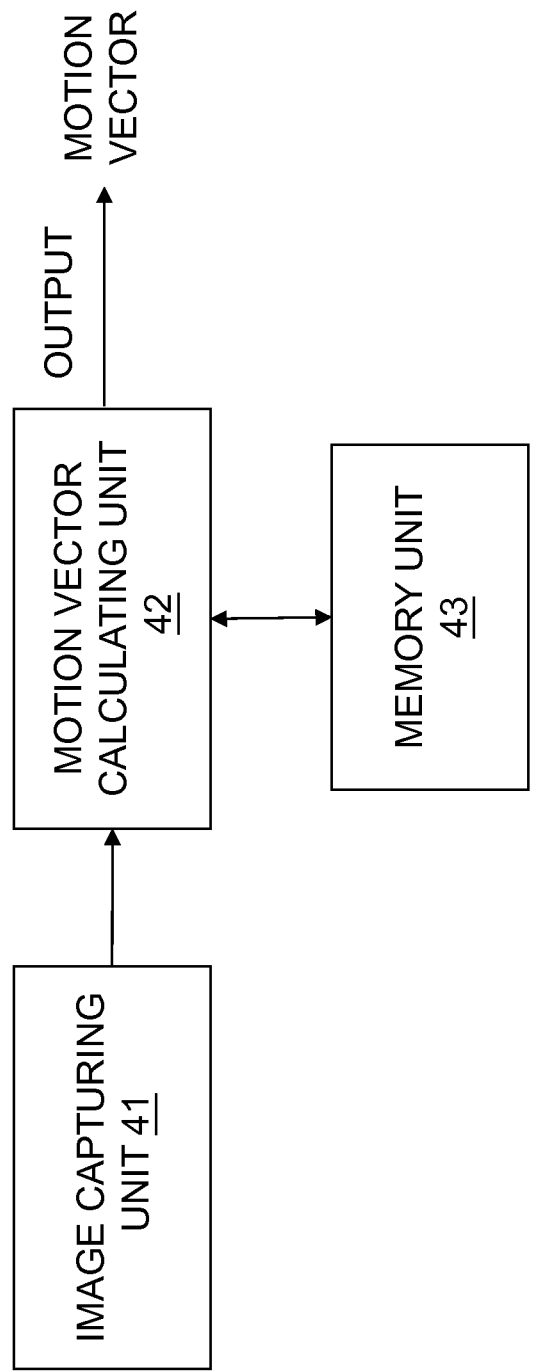
FIG. 4 shows a preferable embodiment of the optical navigation device according to the present invention.

FIG. 4 shows a preferable embodiment of optical navigation device according to the present invention. The optical navigation device includes an image capturing unit 41, a motion vector calculating unit 42, and a memory unit 43. The image capturing unit 41 sequentially captures plural images and generates corresponding electronic data. The motion vector calculating unit 42 receives the electronic data from the image capturing unit 41, and calculates and outputs a motion vector according to the aforementioned optical navigation method. During the calculation process, when it is required, the memory unit 43 stores e.g. the main reference block, the ancillary reference block, and/or other data. The image capturing unit 41 for example can be but not limited to an image sensor; the motion vector calculating unit 42 for example can be but not limited to a processor; the memory unit 43 for example can be but not limited to a buffer memory.

In comparison with the prior art, because the present invention adaptively and dynamically adjusts the size of the reference block and/or the area for block matching comparison, and calculation quantity is greatly reduced and it is not required to frequently update the main reference block. As such, the calculation efficiency is much better and the number of times required to access the memory unit 43 is less.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the sizes of the images, the main reference blocks, and the ancillary reference blocks shown in the aforementioned embodiments and figures are for illustrative purpose only and can be modified to other sizes; the shapes of the image, the main reference block, and the ancillary reference block are not necessarily square but can be other shapes. The size of the reference block and the area for block matching comparison are not necessarily adjusted in both horizontal and vertical directions, and the adjustments can be done in only one dimension. The term "one unit" as used in the above can be corresponding to one or more pixels. The terms "sequential" and "successive" only intend to mean an order with respect to time between two obtained images, but do not intend to mean that the two obtained images must be one immediately following the other. That is, there can be one or more images between the two "sequential" or "successive" images. By the same concept, the term "most recent" image or motion vector is not necessarily the very last image or motion vector, but can be an image or motion vector that is relatively recent. Besides, a circuit or device which does not affect the primary function of the units can be inserted between two units shown to be in direct connection in the figures. An embodiment or a claim of the present invention does not need to attain or include all the objectives, advantages or features described in the above. The abstract and the title are provided for assisting searches and not to be read as limitations to the scope of the present invention.

What is claimed is:

1. An optical navigation method, comprising:
sequentially obtaining plural images including a first, a second, and a third image;
choosing a main reference block in the first image according to a predetermined sampling region and sampling size;
comparing the main reference block and the second image by block matching comparison to determine a first motion vector;
resizing the main reference block according to the first motion vector to generate an ancillary reference block having a size smaller than the main reference block; and
comparing the ancillary reference block and the third image by block matching comparison to determine a second motion vector.

2. The optical navigation method of claim 1, wherein the step of resizing the main reference block according to the first motion vector to generate an ancillary reference block includes:
reducing a horizontal size of the main reference block from the side where a horizontal component of the first motion vector is moving toward by an amount corresponding to the horizontal component, and/or reducing a vertical size of the main reference block from the side where a vertical component of the first motion vector is moving toward by an amount corresponding to the vertical component.

3. The optical navigation method of claim 1, further comprising:
updating the ancillary reference block by resizing the main reference block according to the second motion vector.

4. The optical navigation method of claim 3, wherein the step of updating the ancillary reference block by resizing the main reference block according to the second motion vector includes:
reducing a horizontal size of the main reference block from a side where a horizontal component of the second motion vector is moving toward by an amount corresponding to the horizontal component, and/or reducing a vertical size of the main reference block from a side where a vertical component of the second motion vector is moving toward by an amount corresponding to the vertical component.

5. The optical navigation method of claim 1, further comprising:
setting a lower limit;
generating new motion vectors according to new images; and
updating the ancillary reference block according to a most recent motion vector unless a size of the updated ancillary reference block is smaller than the lower limit.

6. The optical navigation method of claim 1, further comprising:
resizing an area for block matching comparison with the ancillary reference block in the third image.

7. The optical navigation method of claim 6, wherein the step of resizing the area for block matching comparison with the ancillary reference block in the third image includes:
reducing the area for block matching comparison from a side opposite to where a horizontal component of the first motion vector is moving toward, and/or reducing the area for block matching comparison from a side opposite to where a vertical component of the first motion vector is moving toward.

8. The optical navigation method of claim 6, wherein the step of resizing the area for block matching comparison with the ancillary reference block in the third image includes:
reducing the area for block matching comparison from a side opposite to where a horizontal component of an average of plural previous motion vectors is moving toward by an amount corresponding to the horizontal component, and/or reducing the area for block matching comparison from a side opposite to where a vertical component of an average of plural previous motion vectors is moving toward by an amount corresponding to the vertical component.

9. The optical navigation method of claim 6, further comprising:
checking whether a motion trend is confirmed according to plural motion vectors; and
resizing the area for block matching comparison with the ancillary reference block in the third image only when the motion trend is confirmed.

10. The optical navigation method of claim 9, wherein the step of checking whether a motion trend is confirmed according to plural motion vectors includes one or more of:
confirming whether a motion along a direction lasts for more than a threshold period of time or is counted for more than a threshold number of times; or
confirming whether an average motion along a direction is larger than a threshold.

11. The optical navigation method of claim 3, further comprising:
obtaining a fourth image;
comparing the updated ancillary reference block and the fourth image by block matching comparison to determine a third motion vector; and
resizing the area for block matching comparison with the updated ancillary reference block in the fourth image according to the second motion vector.

12. The optical navigation method of claim 11, wherein the step of resizing the area for block matching comparison with the updated ancillary reference block in the fourth image according to the second motion vector includes:
reducing the area for block matching comparison from a side opposite to where a horizontal component of the second motion vector is moving toward, and/or reducing the area for block matching comparison from a side opposite to where a vertical component of the second motion vector is moving toward.

13. The optical navigation method of claim 1, further comprising:
generating new motion vectors according to new images;
updating the ancillary reference block according to a most recent motion vector; and
performing one of the following steps when the updated ancillary reference block does not have an enough feature value:
(1) choosing a new main reference block in a most recent image according to the predetermined sampling region and sampling size;
(2) choosing a new main reference block in a most recent image according to a horizontal component and/or a vertical component of a most recent motion vector; or
(3) choosing a new ancillary reference block in a most recent image by reducing a horizontal size of the predetermined sampling region from a side where a horizontal component of a most recent motion vector is moving toward by an amount corresponding to the horizontal component, and/or reducing a vertical size of the predetermined sampling region from a side where a vertical component of the second motion vector is moving toward by an amount corresponding to the vertical component.

14. The optical navigation method of claim 13, further comprising: checking whether a motion trend is confirmed according to plural most recent motion vectors; and wherein the step of performing one of the steps (1)-(3) is performed when the motion trend is confirmed.

15. The optical navigation method of claim 14, wherein the step of checking whether a motion trend is confirmed includes one or more of:
confirming whether a motion along a direction lasts for more than a threshold period of time or is counted for more than a threshold number of times; or
confirming whether an average motion along a direction is larger than a threshold.

16. The optical navigation method of claim 1, further comprising:
generating new motion vectors according to new images;
updating the ancillary reference block according to the most recent motion vector; and
choosing a new main reference block or a new ancillary reference block in a most recent image when one or more of the following conditions is satisfied:
(1) the updated ancillary reference block according to the most recent motion vector has a size smaller than a predetermined lower limit;
(2) a feature value of the updated ancillary reference block according to the most recent motion vector is lower than a predetermined threshold feature value, wherein the feature value is calculated according to a predefined calculation method;
(3) there are two or more possible matching locations where a most recent ancillary reference block corresponds to in the most recent image; and
(4) a time period from choosing a last main reference block to obtaining the most recent image exceeds a predetermined threshold time period.

17. The optical navigation method of claim 16, further comprising: checking whether a motion trend is confirmed according to plural most recent motion vectors; and wherein the step of choosing a new main reference block or a new ancillary reference block is performed when the motion trend is confirmed.

18. The optical navigation method of claim 17, wherein the step of checking whether a motion trend is confirmed includes one or more of:
   confirming whether a motion along a direction lasts for more than a threshold period of time or is counted for more than a threshold number of times; or
   confirming whether an average motion along a direction is larger than a threshold.

19. An optical navigation device, comprising:
   an image capturing unit for sequentially capturing plural images and generating corresponding electronic data, wherein the plural images including a first image, a second image and a third image;
   a motion vector calculating unit, for receiving the electronic data from the image capturing unit, and calculating motion vectors according to the following steps:
      choosing a main reference block in the first image according to a predetermined sampling region and sampling size;
      comparing the main reference block and the second image by block matching comparison to determine a first motion vector;
      resizing the main reference block according to the first motion vector to generate an ancillary reference block having a size smaller than the main reference block; and
      comparing the ancillary reference block and the third image by block matching comparison to determine a second motion vector; and
   a memory unit, for storing the main reference block and/or the ancillary reference block.

20. The optical navigation device of claim 19, wherein the step of resizing the main reference block according to the first motion vector to generate an ancillary reference block includes:
   reducing a horizontal size of the main reference block from the side where a horizontal component of the first motion vector is moving toward by an amount corresponding to the horizontal component, and/or reducing a vertical size of the main reference block from the side where a vertical component of the first motion vector is moving toward by an amount corresponding to the vertical component.

21. The optical navigation device of claim 19, wherein the motion vector calculating unit further performs the following step:
   updating the ancillary reference block by resizing the main reference block according to the second motion vector.

22. The optical navigation device of claim 21, wherein the step of updating the ancillary reference block by resizing the main reference block according to the second motion vector includes:
   reducing a horizontal size of the main reference block from a side where a horizontal component of the second motion vector is moving toward by an amount corresponding to the horizontal component, and/or reducing a vertical size of the main reference block from a side where a vertical component of the second motion vector is moving toward by an amount corresponding to the vertical component.

23. The optical navigation device of claim 19, wherein the motion vector calculating unit further performs the following steps:
   setting a lower limit;
   generating new motion vectors according to new images; and
   updating the ancillary reference block according to a most recent motion vector unless a size of the updated ancillary reference block is smaller than the lower limit.

24. The optical navigation device of claim 19, wherein the motion vector calculating unit further performs the following step:
   resizing an area for block matching comparison with the ancillary reference block in the third image.

25. The optical navigation device of claim 24, wherein the step of resizing the area for block matching comparison with the ancillary reference block in the third image includes:
   reducing the area for block matching comparison from a side opposite to where a horizontal component of the first motion vector is moving toward, and/or reducing the area for block matching comparison from a side opposite to where a vertical component of the first motion vector is moving toward.

26. The optical navigation device of claim 24, wherein the step of resizing the area for block matching comparison with the ancillary reference block in the third image includes:
   reducing the area for block matching comparison from a side opposite to where a horizontal component of an average of plural previous motion vectors is moving toward by an amount corresponding to the horizontal component, and/or reducing the area for block matching comparison from a side opposite to where a vertical component of an average of plural previous motion vectors is moving toward by an amount corresponding to the vertical component.

27. The optical navigation device of claim 24, further including:
   checking whether a motion trend is confirmed according to plural motion vectors; and
   resizing the area for block matching comparison with the ancillary reference block in the third image only when the motion trend is confirmed.

28. The optical navigation device of claim 27, wherein the step of checking whether a motion trend is confirmed according to plural motion vectors includes one or more of:
   confirming whether a motion along a direction lasts for more than a threshold period of time or is counted for more than a threshold number of times; or
   confirming whether an average motion along a direction is larger than a threshold.

29. The optical navigation device of claim 21, wherein the motion vector calculating unit further performs the following steps:
   obtaining a fourth image;
   comparing the updated ancillary reference block and the fourth image by block matching comparison to determine a third motion vector; and
   resizing the area for block matching comparison with the updated ancillary reference block in the fourth image according to the second motion vector.

30. The optical navigation device of claim 29, wherein the step of resizing the area for block matching comparison with the updated ancillary reference block in the fourth image according to the second motion vector includes:
   reducing the area for block matching comparison from a side opposite to where a horizontal component of the second motion vector is moving toward, and/or reducing the area for block matching comparison from a side opposite to where a vertical component of the second motion vector is moving toward.

31. The optical navigation device of claim 19, wherein the motion vector calculating unit further performs the following steps:
- generating new motion vectors according to new images;
- updating the ancillary reference block according to a most recent motion vector; and
- performing one of the following steps when the updated ancillary reference block does not have an enough feature value:
  (1) choosing a new main reference block in a most recent image according to the predetermined sampling region and sampling size;
  (2) choosing a new main reference block in a most recent image according to a horizontal component and/or a vertical component of a most recent motion vector; or
  (3) choosing a new ancillary reference block in a most recent image by reducing a horizontal size of the predetermined sampling region from a side where a horizontal component of a most recent motion vector is moving toward by an amount corresponding to the horizontal component, and/or reducing a vertical size of the predetermined sampling region from a side where a vertical component of the second motion vector is moving toward by an amount corresponding to the vertical component.

32. The optical navigation device of claim 31, further comprising: checking whether a motion trend is confirmed according to plural most recent motion vectors; and wherein the step of performing one of the steps (1)-(3) is performed when the motion trend is confirmed.

33. The optical navigation device of claim 32, wherein the step of checking whether a motion trend is confirmed includes one or more of:
- confirming whether a motion along a direction lasts for more than a threshold period of time or is counted for more than a threshold number of times; or
- confirming whether an average motion along a direction is larger than a threshold.

34. The optical navigation device of claim 19, further comprising:
- generating new motion vectors according to new images;
- updating the ancillary reference block according to the most recent motion vector; and
- choosing a new main reference block or a new ancillary reference block in a most recent image when one or more of the following conditions is satisfied:
  (1) the updated ancillary reference block according to the most recent motion vector has a size smaller than a predetermined lower limit;
  (2) a feature value of the updated ancillary reference block according to the most recent motion vector is lower than a predetermined threshold feature value, wherein the feature value is calculated according to a predefined calculation method;
  (3) there are two or more possible matching locations where a most recent ancillary reference block corresponds to in the most recent image; and
  (4) a time period from choosing a last main reference block to obtaining the most recent image exceeds a predetermined threshold time period.

35. The optical navigation device of claim 34, further comprising: checking whether a motion trend is confirmed according to plural most recent motion vectors; and wherein the step of choosing a new main reference block or a new ancillary reference block is performed when the motion trend is confirmed.

36. The optical navigation device of claim 35, wherein the step of checking whether a motion trend is confirmed includes one or more of:
- confirming whether a motion along a direction lasts for more than a threshold period of time or is counted for more than a threshold number of times; or
- confirming whether an average motion along a direction is larger than a threshold.

* * * * *